(12) United States Patent
Simoni et al.

(10) Patent No.: US 7,443,908 B2
(45) Date of Patent: Oct. 28, 2008

(54) LOW COMPLEXITY DETECTION IN DIGITAL RECEIVERS

(75) Inventors: Lorena Simoni, Cesano Boscone (IT); Andrea Concil, Novara (IT); Giuseppe Avellone, Palermo (IT); Piero Castoldi, Parma (IT); Hisashi Kobayashi, Princeton, NJ (US); Luca Fanucci, Montecatini Terme (IT); Riccardo Grasso, Salice Salentino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1014 days.

(21) Appl. No.: 10/300,661

(22) Filed: Nov. 19, 2002

(65) Prior Publication Data
US 2003/0147455 A1  Aug. 7, 2003

Related U.S. Application Data

(60) Provisional application No. 60/333,407, filed on Nov. 26, 2001.

(51) Int. Cl.
*H04B 1/00* (2006.01)

(52) U.S. Cl. .................................................. 375/148

(58) Field of Classification Search ............... 375/140, 375/142, 143, 144, 147, 148, 150, 151, 229, 375/230, 232, 343, 346, 348, 349, 350; 708/323; 379/406.08, 406.09; 370/320, 321, 335, 370/336, 337, 342, 344, 347, 442, 445; 455/500, 455/501, 506, 517, 526, 63.1, 67.13, 516, 455/560, 132, 296, 561

See application file for complete search history.

(56) References Cited

U.S. PATENT DOCUMENTS

| 5,388,127 A | * | 2/1995 | Scarpa | 375/376 |
| 6,047,020 A | * | 4/2000 | Hottinen | 375/130 |
| 6,724,743 B1 | * | 4/2004 | Pigeonnat | 370/335 |
| 6,885,654 B2 | * | 4/2005 | Pan et al. | 370/342 |
| 2001/0024426 A1 | * | 9/2001 | Zeira et al. | 370/329 |
| 2003/0112904 A1 | * | 6/2003 | Fuller et al. | 375/350 |

OTHER PUBLICATIONS

Partor et al. Impact of Channel Estimation on the 3GPP-TD-CDMA, 2001, IEEE,p. 3365-3369.*
Demir et al. U.S. Appl. No. 60/328,590.*
Castoldi, P., et al., "Low Complexity Group Detectors for Multirate Transmission in TD-CDMA 3G Systems," *Wireless Broadband Symposium (Globecom 2000)*. San Francisco: 25-30, Nov. 27, 2000.
Ghauri, I., et al., "Linear receivers for the DS-CDMA Downlink Exploiting Orthogonality of Spreading Sequences," *32nd Asilomar Conf. on Sig., Syst. and Comp.*: 650-654, Nov. 1998.

(Continued)

*Primary Examiner*—Sam K Ahn
(74) *Attorney, Agent, or Firm*—Lisa K. Jorgenson; Timothy L. Boller; Seed IP Law Group PLLC

(57) ABSTRACT

A receiver for receiving digital signals exposed to intersymbol interference as well as multiple access interference the method including linearly detecting said signals by combating said intersymbol interference by equalizing said received digital signals as well as mitigating said multiple access interference by detecting said digital signals using sliding window detection.

50 Claims, 4 Drawing Sheets

OTHER PUBLICATIONS

Haardt, M., et al., "The TD-CDMA Based UTRA-TDD Mode," *IEEE Journal on Sel. Areas in Comm.* 18(8): 1375-1385, Aug. 2000.

Holma, H., et al., "Interference Considerations for the Time Division Duplex Mode of the UMTS Terrestrial Radio Access," *Journal on Sel. Areas in Comm.* 18(8): 1386-1393, Aug. 2000.

Klein, A., "Data Detection Algorithms Specially designed for the Downlink of CDMA Mobile Radio Systems," *Vehicular Technology Conference (VTC '97)*, Phoenix, AZ:203-207, May 1997.

Klein A., et al., "Equalizers for multi-user detection in code division multiple access mobile radio systems," *Vehicular Technology Conference (VTC '94)*: 762-766, 1994.

Klein A., et al., "Linear Unbiased Data Estimation in Mobile Radio Systems Applying CDMA," *IEEE Journal on Sel. Areas in Comm.* 11(7): 1058-1066, Sept. 1993.

Klein, A., et al., "Zero Forcing and Minimum Mean-Square-Error Equalization for Multiuser Detection in Code Division Multiple-Access Channels," *IEEE Trans. on Vehicular Technology* 45(2): 276-287, May 1996.

Mitra, U., "Comparison of Maximum-Likelihood-Based Detection of Two Multirate Access Schemes for CDMA Signals," *IEEE Trans. on Comm.* 47(1): 64-67, Jan. 1999.

"3GPP TS 25.221 v4.0.0," *3rd Generation Partnership Project (3GPP) website, Radio Interface Technical Specifications,* ftp://ftp.3gpp.org/Specs/2001-06/>: 1-87, Dec. 2000.

"3GPP TS 25.301 v4.1.0," *3rd Generation Partnership Project (3GPP) website, Radio Interface Technical Specifications,* ftp://ftp.3gpp.org/Specs/2001-06/>: 1-39, Jun. 2001.

* cited by examiner

| $G_{red}^H G_{red}$ | $L_0^H U_0$ | $L_1^H U_1$ | ... | $L_m^H U_m$ | 0 | ... | 0 | 0 |
|---|---|---|---|---|---|---|---|---|
| | $G_{red}^H G_{red}$ | $L_0^H U_0$ | $L_1^H U_1$ | ... | $L_m^H U_m$ | 0 | ... | 0 |
| | | $G_{red}^H G_{red}$ | $L_0^H U_0$ | $L_1^H U_1$ | ... | $L_m^H U_m$ | 0 | ... |
| | | | $G_{red}^H G_{red}$ | $L_0^H U_0$ | $L_1^H U_1$ | ... | $L_m^H U_m$ | 0 |
| | | | | $G_{red}^H G_{red}$ | $L_0^H U_0$ | $L_1^H U_1$ | ... | $L_m^H U_m$ |
| | | | | | $G_{red}^H G_{red}$ | $L_0^H U_0$ | $L_1^H U_1$ | ... |
| | | | | | | $G_{red}^H G_{red}$ | $L_0^H U_0$ | $L_1^H U_1$ |
| | | | | | | | $G_{red}^H G_{red}$ | $L_0^H U_0$ |
| | | | | | | | | $G_{red}^H G_{red}$ |

LOW COMPLEXITY DETECTION IN DIGITAL RECEIVERS

BACKGROUND OF THE INVENTION

1. Field of the Invention

The present invention relates to detectors for use in digital receivers. The invention was developed by paying specific attention to the possible use in third generation (3G) UTRA TDD mode systems for downlink detection in mobile equipment. UTRA and TDD are widely used acronyms for Universal Terrestrial Radio Access and Time Division Duplex, respectively.

2. Description of the Related Art

In Code Division Multiple Access (CDMA) system several independent users are simultaneously active in the same frequency band, and they are only separated by different user-specific signature sequences. A set of orthogonal code sequences of variable length (Orthogonal Variable Spreading Factor or OVSF) is used allowing a large flexibility in data transmission rate: see, for instance "The TD-CDMA based UTRA-TDD Mode", by M. Haardt, A. Klein, R. Koehn, S. Oestreich, M. Purat, V. Sommer, T. Ulrich, IEEE Journal on Sel. Areas in Comm., vol. 18, n. 8, August 2000, pp. 1375-1385, which is incorporated herein by reference in its entirety.

Some efforts have been devoted to investigating receivers for multirate CDMA transmission: see, e.g., "Linear receivers for the DS-CDMA Downlink Exploiting Orthogonality of Spreading Sequences", by I. Gauri, D. Slock, $32^{nd}$ Asilomar Conf. on Sig., Syst. and Comp., November 1998; "Low Complexity Group Detectors for Multirate Transmission in TD-CDMA 3G Systems", by P. Castoldi and H. Kobayashi, Wireless Broadband Symposium (Globecom 2000) San Francisco, 27 Nov. 2000; "Comparison of Maximum Likelihood-based Detection of Two Multi-rate Access Schemes for CDMA Signals", by U. Mitra, IEEE Trans. on Commun, January 1999; "Interference considerations for the Time Division Duplex Mode of the UMTS Terrestrial Radio Access", by H. Holma, S. Heikkinen, O.-A. Lehtinen and A. Toskala, Journal on Sel. Areas in Comm., vol.18, n. 8, August 2000, pp. 1386-1393, which are each incorporated herein by reference in their entireties.

Some algorithms have been designed especially for uplink signal detection. These algorithms are based on the zero forcing (ZF) and the minimum mean-square-error (MMSE) criteria as witnessed, e.g., by "Zero Forcing and Minimum Mean-Square-Error Equalization for Multiuser Detection in Code Division Multiple-Access Channels", by A. Klein, G. Kaleh, and P. Baier, IEEE Trans. on Vehic. Technology, vol. 45, n. 2, May 1996, which is incorporated herein by reference in its entirety. Basically, these solutions are based on channel equalization followed by a code-matched filter, which permits multi-path diversity to be exploited for the radio channel.

The solutions indicated in the foregoing suffer to a lesser or greater extent from a number of drawbacks, e.g.:

- a system model that assumes a fixed data rate or an equally fixed spreading factor;
- implementation as a fixed block multi-user detection scheme (see, e.g., the paper by A. Klein et al. already cited in the foregoing or "Data Detection Algorithms especially designed for the downlink of CDMA Mobile Radio Receivers", by A. Klein, Vehicular Technology Conference (VTC '97), Phoenix, Ariz., pp. 203-207, May 1997), which is incorporated herein by reference in its entirety, that is computationally prohibitive even for burst transmission with short data fields;
- inter-cell interference, due to the neighboring cells, is not rejected and is only modeled as non-white gaussian noise;
- generally, the multiple access interference (MAI) component for a mobile user equipment (UE) is not considered as structured: each mobile has only knowledge of its own signatures and has no information about interfering users in the same cell.

BRIEF SUMMARY OF THE INVENTION

An embodiment of the present invention provides a solution exempt from the drawbacks and disadvantages inherent in the prior art solutions considered in the foregoing.

In the case of detection of multi-rate transmission, data assigned to each mobile user are carried by a group of codes whose size varies from one to the totality of all active codes.

An embodiment of the invention provides a linear detector that combats intersymbol interference (ISI) by equalization and multiple access interference (MAI) by interference mitigation, using a sliding window formulation that is valid for both ZF and MMSE criteria. The intracell signal, in the downlink transmission, is modeled as related to a synchronous CDMA system where all codes experience the same propagation channel. Also, intercell signal can be described by the same structure as the intracell signal. In particular, every intracell component is given by the sum of synchronous CDMA signals but intercell signals are the sum of intracell components asynchronous to each other.

An embodiment of a receiver according to the invention relies on the fact that detection performed at a mobile station (MS) can always take advantage of explicit knowledge of all the intracell codes currently assigned to a base station (BS). Preferably, the codes destined to a specific MS are notified using a control channel as disclosed, e.g., in the 3rd Generation Partnership Project (3GPP) website, Radio Interface Technical Specifications, ftp://ftp.3gpp.org/Specs/2001-06/), which is incorporated herein by reference in its entirety, while those related to the other active users can be determined by processing the midamble of the packet. Hence, the observation model always includes a "structured" description of the intracell signals, while the intercell interference is treated according to different levels of signal description. Preferably, the direct intracell mitigation feature is always "set on", whereas various options are made available depending on different needs for co-channel intercell interference suppression. When a soft handover procedure is active, all the parameters related to the neighboring cells are known to the MS; they can be used in order to represent a structured description of the intercell signals and to allow its direct mitigation. Moreover, the knowledge of information concerning the neighboring cells lets the MS to detect data sent by more than one base station (BS).

Preferably, the algorithm is implemented by using a bank of FIR filters and a symbol-by-symbol decision device.

BRIEF DESCRIPTION OF THE SEVERAL VIEWS OF THE DRAWINGS

The invention will now be briefly described, by way of example only, with reference to the annexed figures of drawing, wherein.

DETAILED DESCRIPTION OF THE INVENTION

Essentially, the invention extends the previous algorithms disclosed in the two last-cited papers as well as in "Equalizers for multiuser detection in code division multiple access mobile radio systems", by A. Klein, G. Kaleh, and P. Baier, Vehicular Technology Conference (VTC '94) pp. 762-766, 1994; "Linear Unbiased Data Estimation in Mobile Radio Systems Applying CDMA", by A. Klein, and P. Baier; IEEE Journal on Selected Areas in Communications, vol. 11, n. 7, September 1993; and "Linear Receivers for the DS-CDMA Downlink Exploiting Orthogonality of Spreading Sequences", by I. Ghauri, and D. Slock, 32$^{nd}$ Asilomar Conf. on Signal, Systems and Computers (Pacific Grove, Calif.), November 1998, which are incorporated herein by reference in their entireties.

In the following a user specific, orthogonal variable spreading factor (OVSF) spreading code followed by scrambling of the BS specific overlay sequence will be taken into account.

Firstly, a single cell scenario will be considered where J synchronous intracell codes are sent over a slowly varying multipath fading channel and additive white gaussian noise (AWGN) further corrupts the received signal.

In order to describe the multirate data streams the following parameters are considered:

J number of synchronous users in a cell;

$Q_j$ spreading factor (SF) for j-th user;

$N_j$ data sequence length: it depends on the spreading factor $Q_j$;

$(w_j(0), w_j(1), w_j(2), \ldots, w_j(Q_j-1))$ OVSF channelization code for the j-th user;

$y^N(t)$ data symbol sequence that is spread by the j-th code (j=1, 2, ..., J); the chip interval $T_C$ is constant in a TDD system but the symbol interval $T_j = Q_j \cdot T_C$ may be different for different data streams;

$$z(n; i) \; n = 0, 1, \ldots, \frac{Q_{max}}{Q_j} - 1; \; i = 0, 1, \ldots, Q_j - 1$$

scrambling code for j-th user. The index 'n' ticks with the symbol interval and 'i' runs on the chip interval; this scrambling window has a length of $Q_{max}$ chips (maximum SF which is equal to 16) and includes $$\frac{Q_{max}}{Q_j}$$

symbols;

$$c_j(n; k) \equiv w_j(k) \cdot z\left(\lfloor n-1 \rfloor_{\frac{Q_{max}}{Q_j}}; k\right)$$

$$n = 1, \ldots, N_j; k = 0, 1, \ldots, Q_j - 1$$

spreading sequence for for n-th symbol;

p(t) transmitter filter impulse response;

q(t) receiver filter impulse response (low pass filter);

β oversampling factor; and $$W = \frac{\beta}{T_C}$$

oversampling rate.

Figure 1:
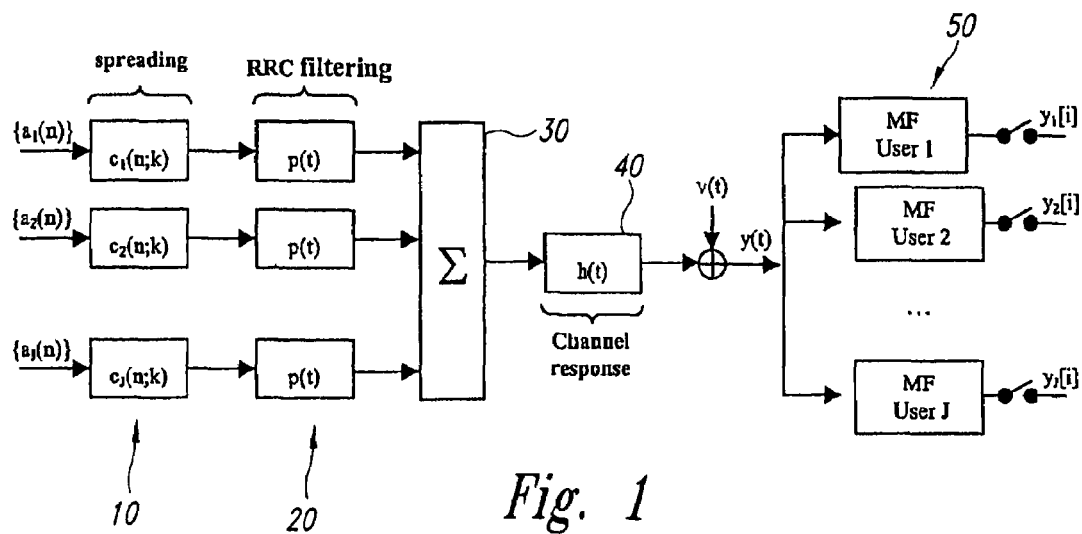
FIG. 1 is a block diagram of a CDMA transmission system.

The baseband transmission system for a single cell is shown in FIG. 1. In FIG. 1, reference 10 designates the various states $c_1(n; k) \ldots c_j(n; k)$ effecting spreading of the input data symbol sequences $\{a_1(n)\} \ldots \{a_j(n)\}$. Reference 20 collectively designates the transmitter filters having identical impulse responses p(t).

Block 30 represent the summing effect derived by the simultaneous or quasi-simultaneous transmission over a transmission channel 40 having an impulse response h(t) and affected by additive noise (AWGN) represented by v(t).

The resulting received signal y(t) is detected by respective detectors (collectively designated 50) to generate respective detected signals $y_1[i] \ldots y_j[i]$.

Assuming linear modulation, the time continuous complex baseband signal after the low pass filter can be expressed as:

$$y(t) = \sum_{j=1}^{J} \sum_{n=1}^{N_j} a_j(n) \sum_{i=0}^{Q_j-1} c_j(i) f(t - (n-1)T_j - iT_C) + \upsilon(t) \quad \text{Eq 1}$$

where:

$f(t)$ is the overall channel impulse response given by the convolution of the pulse chip-shaping p(t) (common to all users) with the multipath channel impulse response h(t);

$$h(t) = \sum_l h_l \delta(t - \tau_l)$$

represents the multipath channel impulse response; and $\upsilon(t)$ is the result of the low pass filtering of $\upsilon(t)$ by q(t).

Because of time spread in the shaping filter and in the channel delay, the f(t) response exhibits a delay spread equal to P chip intervals (P>1).

A chip representation of the signal y(t) can be made by defining the chip sequence $\{b_j(k)\}$ which corresponds to the spreading of the symbol $\{a_j(n)\}$:

$$b_j(k) \equiv a_j(n) \cdot c_j(\lfloor k-1 \rfloor_{Q_j}) \; k = 1, 2, \ldots, N_j \cdot Q_j \; n = \left\lceil \frac{k}{Q_j} \right\rceil \quad \text{Eq 2}$$

where 'k' runs over the chips, 'n' follows the $N_j$ symbol period and $N_j \cdot Q_j$ is the chip length of the sequence transmitted by j-th user.

The received signal y(t) is sampled at rate W and taking into account Eq, its baseband equivalent signal of the single cell transmission system becomes:

$$y_m(t) = \sum_{j=1}^{J} \sum_{k=1}^{P-1} b_j(i-k) f_m(k+1) + \upsilon_m(t) \quad \text{Eq 3}$$

$$m = 1, 2, \ldots, \beta \quad i = 1, 2, \ldots, N_j \cdot Q_j$$

In the following two structures will be proposed related to a single and a multiple cell approach respectively.

Single-Cell Discrete-Time Model

A matrix representation of Eq 3 is considered over $\beta N$ observations $y_m(t)$: the observing window length is $N \cdot T_C$ chips starting from the i-th chip and spanning over N chips backwards $$y^N(t)=[y_1(i-N+1), \ldots, y_\beta(i-N+1), \ldots, y_1(i), \ldots, y_\beta(i)]^T \qquad \text{Eq 4}$$

where $y_1(i), \ldots, y_\beta(i)$ represent $\beta$ subchips for the current i-th chip and $y_1(i-N+1), \ldots, y_\beta(i-N+1)$ correspond to N chips (or $\beta N$ sub-samples) before the current i-th chip. $y^N(t)$ can be expressed in terms of channel samples, spreading codes and data by defining a $\beta \cdot N \times P+N-1$ dimensional matrix.

$$F^{(N)} = \begin{bmatrix} f(P-1) & \ldots & f(0) & \ldots & & & 0 \\ & f(P-1) & \ldots & f(0) & \ldots & & 0 \\ & & & \ldots & & & 0 \\ 0 & & & & f(P-1) & f(P-2) & \ldots & f(0) \end{bmatrix} \qquad \text{Eq 5}$$

where $$f(k)=[f_1(k+1), \ldots, f_\beta(k+1)]^T \quad k=0,1,\ldots,P-1 \qquad \text{Eq 6}$$

The code sequence can be also represented in matrix notation introducing a symbol rate ticking index $$n = \left\lceil \frac{i}{Q_j} \right\rceil:$$

$$C_j^{(N)}(i) \equiv \begin{bmatrix} c_j(n-n_j+1; |i-N-P+1|_{Q_j}) & & & 0 \\ \ldots & & & \\ c_j(n-n_j+1; Q_j-1) & & & \\ 0 & \ldots & & \\ & & c_j(n-l_j+1; 0) & \\ & & \ldots & \\ & & c_j(n-l_j+1; |i-P|_{Q_j}) & \\ & & \ldots & \\ & & c_j(n-l_j+1; Q_j-1) & \\ & & & \ldots & c_j(n; 0) \\ & & & & \ldots \\ 0 & & & & c_j(n; |i-1|_{Q_j}) \end{bmatrix} \qquad \text{Eq 7}$$

where:
$\langle (P+N-1) \times n_j \rangle$ represents the dimension of $C_j^{(N)}(i)$;
$P+N-1$ is the number of observed chips including the delay spread; and $$n_j = \left\lceil \frac{P+N+Q_j-2}{Q_j} \right\rceil$$

denotes the number of symbols involved in the observation window of $N+P-1$ chips length: specifically, it is the number of potential decision variables for all symbols embraced in the processing window for the specific user j-th; and $I_j$ determines the maximum number of symbols introducing ISI in the scalar observation; it depends on SF of each user.

Finally, defining a matrix representation for all active users:

$$C^{(N)}(i) = [C_1^{(N)}(i), C_2^{(N)}(i), \ldots, C_J^{(N)}(i),]^T; \qquad \text{Eq 8}$$

$$\langle C^{(N)}(i) \rangle = \left\langle (N+P-1) \times \sum_{j=1}^{J} n_j \right\rangle$$

$$a^{(N)}(i) = \left[ a_1^{(N)^T}(i), a_2^{(N)'}(i), \ldots, a_J^{(N)^T}(i) \right]^T \qquad \text{Eq 9}$$

$$v^{(N)}(i) = [v_1^{(N)}(i-N+1), \ldots, \qquad \text{Eq 10}$$
$$v_\beta^{(N)}(i-N+1), \ldots, v_1^{(N)}(i), \ldots, v_\beta^{(N)}(i)]^T$$

the following relationship is obtained:

$$y^{(N)}(i)=F^{(N)} \cdot C^{(N)}(i) \cdot a^{(N)}(i)+v^{(N)}(i) \qquad \text{Eq 11}$$

By defining $$b^{(N)}(i)=C^{(N)}(i) \cdot a^{(N)}(i) \qquad \text{Eq 12}$$

$$G^{(N)}(i) = F^{(N)} \cdot C^{(N)}(i); \langle G^{(N)}(i) \rangle = \left\langle (\chi \cdot N) \times \sum_{j=1}^{J} n_j \right\rangle \qquad \text{Eq 13}$$

the following expression can be derived:

$$y^{(N)}(i) = F^{(N)} \cdot b^{(N)}(i) + v^{(N)}(i) \qquad \text{Eq 14}$$
$$= G^{(N)} \cdot a^{(N)}(i) + v^{(N)}(i)$$

Multiple-Cell Discrete-Time Model

The intercell signal model has the following basic features:
each intercell signal can be modeled as an intracell one: all active users belonging to a common cell are synchronous, and each intercell signal is asynchronous with respect to the others, but it can be regarded as chip synchronous.

In this scenario a different noise term can be defined due to interference of neighboring transmitting cell:

$$n^{(N)}(i) = v^{(N)}(i) + z^{(N)}(i) \quad \text{Eq 15}$$

which includes thermal noise $v^{(N)}(i)$ and intercell interference $z^{(N)}(i)$.

The observation vector can be extended in the following equation:

$$y^{(N)}(i) = F^{(N)} \cdot b^{(N)}(i) + n^{(N)}(i) \quad \text{Eq 16}$$
$$= G^{(N)} \cdot a^{(N)}(i) + n^{(N)}(i)$$

Two different approaches can be considered depending on the scenario and the intercell interference information available, i.e., an unstructured model or a structured model.

In the case of an unstructured model no information is available about neighboring cells so only a statistical description of $z^{(N)}(i)$, as gaussian colored noise, is possible. The global noise term will be gaussian with correlation matrix $$R_n(i) = \sigma_v^2 \cdot I + R_z(i) \quad \text{Eq 17}$$

A structured model is useful when knowledge is available on those interference parameters that allow for a fully structured interference mitigation. Recalling that intercell interference consists of the superposition of a few asynchronous, but block-synchronous, CDMA signals with the same structure of the useful intracell signal, a "finer" model can be derived for the time-discrete received signal:

$$y^{(N)}(i) = F_d^{(N)} \cdot b_d^{(N)}(i) + \sum_{\lambda=1}^{L} F_\lambda^{(N)} \cdot b_\lambda^{(N)}(i) + v^{(N)}(i) \quad \text{Eq 18}$$

where subscript 'd' identifies the desired intracell signal while the summation over 'λ' accounts for the L intercell signals. From this observation model the second term can be associated to the $z^{(N)}(i)$ component:

$$z^{(N)}(i) = \sum_{\lambda=1}^{L} F_\lambda^{(N)} \cdot b_\lambda^{(N)}(i) \quad \text{Eq 19}$$

which in this case is not considered as Gaussian colored noise but is completely known by the user.

Figure 2:
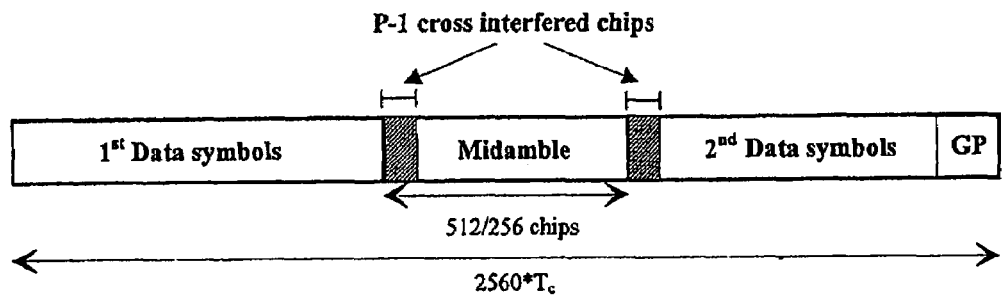
FIG. 2 shows a typical slot format for UTRA TDD consisting of two data symbol fields, a midamble and a guard period.

A proposed UTRA TDD compliant slot format is shown in FIG. 2.

The format in question consists of two data symbol fields, a midamble and a guard period (GP).

Solution such as zero forcing (ZF) or minimum mean square error (MMSE) as disclosed in the article by A. Klein et al. cited in the introductory portion of the description are block detectors. Finite complexity solutions of these detectors are necessary in order to employ them in practical implementation.

Here a processing window definition and a sliding window formulation of the above mentioned detectors are defined in order to employ them for a practical implementation on receivers. The following derivation is referred to the linear detector MMSE of A. Klein et al. in which the Wiener estimator is $$W_{MI} = [I + (R_b \cdot F^H \cdot R_n^{-1} \cdot F)^{-1}]^{-1} \quad \text{Eq 20}$$

The width of the processing window must be large enough to ensure proper interference mitigation for the data stream with the largest spreading factor Q currently used by the system (which may be smaller than $Q_{max}$). This design strategy yields a low rate linear detector because the detection step follows the symbol rate of the slowest user. In this case a symbol-by-symbol detection strategy is used in which a processing window of size $\tilde{N} = Q + P - 1$ chip intervals is selected.

This choice is possible because the vector $y^{(N)}(i)$ can be assumed with stationary statistics if the number of chip present in a data field is $N \geq Q$. All the observation samples that carry energy of a symbol spread with the largest spreading factor, are collected and used for the detection.

In the following a sliding window algorithm is described for the first data block of FIG. 2 and the algorithm proceeds backward starting from the symbols closest to the midamble.

The parameter $$K = \frac{N}{Q}$$

is defined in order to represent the number of symbols in the associated data stream with the largest spreading factor, while also defining:

$$\tilde{y}(k) = y^{(Q+P-1)}(kQ+P-1) \quad k=1,2,\ldots,K \quad \text{Eq 21}$$

$$\tilde{a}(k) = a^{(Q+P-1)}(kQ+P-1) \quad k=1,2,\ldots,K \quad \text{Eq 22}$$

By further defining the matrices:

$$\tilde{G} = G^{(Q+P-1)}(kQ+P-1) \quad \text{Eq 23}$$

$$\tilde{R}_a = R_a^{(Q+P-1)}(kQ+P-1) \quad \text{Eq 24}$$

$$\tilde{R}_n = R_n^{(Q+P-1)}(kQ+P-1) \quad \text{Eq 25}$$

$$\tilde{W}_{MI} = W_{MI}^{(Q+P-1)}(kQ+P-1) \quad \text{Eq 26}$$

the linear transformation becomes:

$$\tilde{T} = (\tilde{G}^H \cdot \tilde{R}_n^{-1} \cdot \tilde{G} + \tilde{R}_a^{-1})^{-1} \cdot \tilde{G}^H \cdot \tilde{R}_n^{-1} \quad \text{Eq 27}$$
$$= \tilde{W}_{MI} \cdot (\tilde{G}^H \cdot \tilde{R}_n^{-1} \cdot \tilde{G})^{-1} \cdot \tilde{G}^H \cdot \tilde{R}_n^{-1}$$

and the decision vector after detection is:

$$\tilde{x}_a(k) = \tilde{T} \cdot \tilde{y}(k) \quad \text{Eq 28}$$

Significantly, while the argument of $y(\cdot)$ runs over the chip interval, that of $\tilde{y}(\cdot)$ runs over the detection step (at the symbol rate of the slowest user).

Vector $\tilde{x}_a(k)$ takes into account symbols for all the active users, so its dimension is given by $$\langle \tilde{x}_a \rangle = \langle n_t \times 1 \rangle \text{ with } n_t = \sum_{j=1}^{J} n_j \quad \text{Eq 29}$$

The total number of potential decision variables for all symbols included in an observation window $\tilde{y}(k)$ is $n_t$.

For each user, a number of decision variables $$\left(\text{of length } \frac{Q}{Q_j}\right)$$

smaller than $n_j$ could yield an optimal decision for the corresponding symbols embraced in ŷ(k). In this way only sub-vectors of x̃$_a$(k) are computed to derive symbols estimated for each user.

A sliding window detector (SWD) of the kind now proposed determines a considerable complexity reduction with respect to common MMSE schemes applied to the whole data stream.

The practical case will first be considered of an UTRA-TDD downlink where only two possible spreading factors are foreseen, $Q_j=1$ and $Q_j=Q_{max}=16$.

While a more detailed and particular description will be provided in the following, it will be appreciated that a SWD embodiment still requires a computational power hardly acceptable for the implementation on a mobile terminal where size and power consumption are the main constraints to be taken into account to provide successful product for the consumer market. For instance, by considering a possible UTRA-TDD case with P=64 and J=16 and by assuming an oversampling factor β=2, a computational power in excess of 3000 GMAC/s is required. This figure is obtained by taking into account all possible simplifications derived by matrix Hermitian properties and by the fact that only a maximum of $Q_{max}$ rows for the T matrix are useful for data detection.

For that reason, a reduced complexity version of the proposed linear detector can be derived that is suitable for implementation in a mobile terminal. The modified solution is obtained by considering a different processing window and by re-arranging all the required matrix calculations in a more regular structure.

The following two hypotheses of practical interest for the UTRA-TDD communication channel are assumed:
- the channel can be regarded as constant for the whole burst duration and so the relevant F matrix in Eq 5 is also constant;
- the global noise term can be regarded as AWGN and with constant power for the whole burst duration and so the relevant correlation matrix $R_n$ in Eq 17 is constant and equal to $R_n=\sigma_n^2 \cdot I$.

The first difference with respect to the previous SWD solutions is that a fixed width of the processing window, equal to Ñ=$Q_{max}$+P−1 symbols, is considered. This window considers only the maximum spreading factor $Q_{max}$ and not the largest Q currently used by the system.

In this way, the C matrix in Eq 8 is constant since a fixed length equal to $Q_{max}$ chips characterizes scrambling codes. Moreover, by assuming uncorrelated and zero mean value QPSK symbols (i.e., $R_a^{-1}$=I), the T̃ matrix of Eq 27 results to be constant for the whole burst duration and becomes:

$$\tilde{T}=(\tilde{G}^H \cdot \tilde{G}+\sigma_n^2 \cdot I)^{-1} \cdot \tilde{G}^H \qquad \text{Eq 30}$$

Following this approach and by considering the same exemplary parameters indicated in the foregoing (i.e., P=64, J=16 and β=2), the overall complexity can be reduced more than 99% resulting in a final figure of about 26 GMAC/s.

Further reduction of the complexity, without any penalty in algorithm performance, can be achieved by re-arranging the original C matrix in Eq 8 as follows:
- step (i): C matrix upper and lower row-extension in order to complete all the codes relevant to the symbols within the processing window; indeed some of them could have been truncated in the original definition Eq 8 depending on the considered value of P.
- step (ii): C matrix extension by P−1 null rows to the upper and lower parts, in order to include all data relevant to the symbols within the processing window.
- step (iii): C matrix column permutations to easy matrix processing by obtaining a more regular data structure.

It will be appreciated that (provided that the same permutations are applied to rows and columns of the $R_a$ matrix) the algorithm is not affected at all by this operation since any permutation on the C matrix column merely corresponds to a permutation in the elements of the detected symbols vector x̃$_a$.

After step (i) and (ii), the extended version $$C_{jext}^N$$

of the $C_j^N$ matrix in Eq 7 has a dimension equal to $$\langle C_{jext}^N \rangle = \langle [n_j \cdot Q_{max} + 2 \cdot (P-1)] \times n_j \rangle \qquad \text{Eq 31}$$

and the extended version $C_{ext}$ of the C matrix in Eq 8 has a dimension $$<C_{ext}>=<[n_j \cdot Q_{max}+2 \cdot (P-1)] \times [n_j \cdot J]> \qquad \text{Eq 32}$$

In this case the parameter $n_j$ is constant because in downlink (DL) transmission all active users have the same spreading factor (Q=1 or Q=16)

As a consequence, also the F matrix (Eq 5) has to be extended accordingly. The resulting $F_{ext}$ matrix has a dimension $$n_j = \left\lceil \frac{Q_{max} + 2P - 2 + Q_j}{Q_j} \right\rceil \quad j=1,2,\ldots,J \qquad \text{Eq 33}$$

$$<F_{ext}>=<[Q_{max} \cdot n_j+P-1)] \cdot \beta \times [n_j \cdot Q_{max}+2 \cdot (P-1)]> \qquad \text{Eq 34}$$

Then, the G and T matrices have to be extended as well ($G_{ext}$ and $T_{ext}$), while the dimension of the $$(\tilde{G}_{ext}^H \cdot \tilde{G}_{ext} + \sigma_n^2 \cdot I)$$

matrix to be inverted is not changed compared to the one in Eq 30.

This general approach will be detailed hereafter for the practical case of the UTRA-TDD downlink where only two possible spreading factors are foreseen, $Q_j=1$ and $Q_j=Q_{max}=16$.

If one refers to the more complex case of $Q_j=Q_{max}=16$ where it is possible to have $J \leq Q_{max}$ active codes and the number of symbols $n_j$ in the processing window is constant. According to step (iii), a permutation of the columns of the row-extended $C_{ext}$ matrix is effected in order to obtain $n_j$ data blocks each block being relevant to the symbols transmitted at the same time instant. By defining $C_{j(i)}$ the i-th column of the $C_{jext}^N$ matrix, the resulting of matrix permutation after step (iii) is:

$$C_{per} = [C_{1(1)}, C_{2(1)}, \ldots C_{J(1)}, C_{1(2)}, C_{2(2)}, \ldots$$
$$C_{J(2)}, \ldots, C_{1(n_j)}, C_{2(n_j)}, \ldots C_{J(n_j)}] \quad \text{Eq. 35}$$

Significantly, $C_{per}$ is a block matrix where all the not-null blocks are identical. This basic block, whose dimension is $<Q_{max} \times J>$ is denoted $C_{red}$. The proposed solution does not require the direct use of $C_{per}$ matrix. As it will be detailed hereafter the processing is based only on its basic block $C_{red}$.

The $F_{red}$ matrix defined as in Eq 5 is then introduced with dimension:

$$<F_{red}> = <[Q_{max}+P-1)] \cdot \beta \times [Q_{max}+2 \cdot (P-1)]> = <\beta \cdot N \times [N+P-1]> \quad \text{Eq 36}$$

Starting from the $C_{red}$ and $F_{red}$, a matrix $G_{red}$, whose dimension is $<\beta \cdot N \times J>$, is obtained as follows:

$$G_{red} \equiv F_{red} \cdot \begin{pmatrix} 0 \\ C_{red} \\ 0 \end{pmatrix} \begin{matrix} \to P-1 \text{ rows} \\ \to Q_{max} \text{ rows} \\ \to P-1 \text{ rows} \end{matrix} \quad \langle G_{red} \rangle = \langle (\beta \cdot N) \times J \rangle \quad \text{Eq 37}$$

The elements of the matrix $G_{red}$ can be efficiently obtained by direct convolution (by means of finite impulse response (FIR) and shift registers) of the rows of the matrix $[f(0), \ldots, f(P-2), f(P-1)]$ and the columns of the $C_{red}$ matrix, where $f(k)$ is defined in Eq 6.

For the sake of clarity, the $G_{ext}$ matrix (see FIG. 3) can be introduced, based on the above-defined $G_{red}$, whose dimension is $<[Q_{max} \cdot n_j+P-1)] \cdot \beta \times J \cdot n_j)$.

Figures 3, 5:
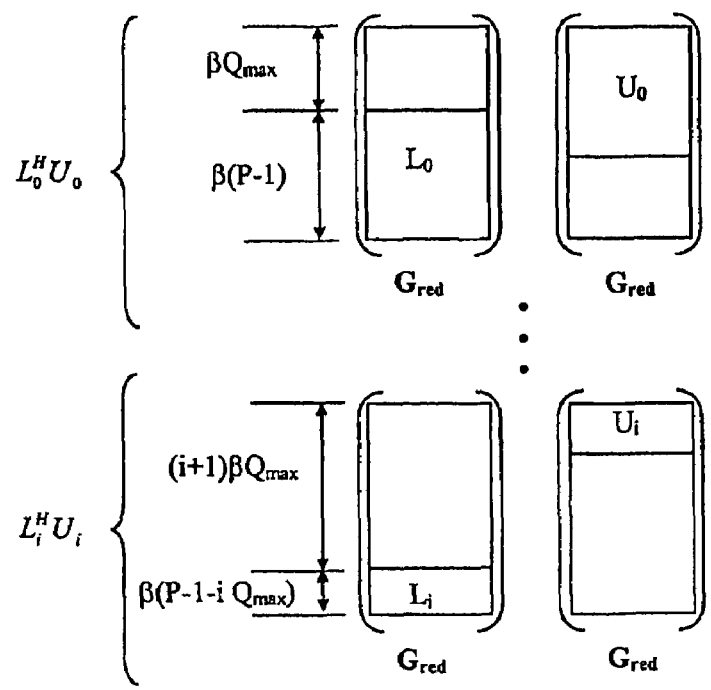
FIG. 3 shows an exemplary matrix structure for use in a low complexity detector according to the invention.
FIG. 5 shows an extension of the product of FIG. 4.

As it will be detailed hereafter, the proposed algorithm does not require the direct use of such $G_{ext}$ matrix because the $$G_{ext}^H G_{ext}$$

foreseen computation can be carried out by means of the following two steps:
evaluate the upper triangular part of $$G_{red}^H G_{red}$$

matrix;
evaluate the $(n_j-1)/2$ matrices such as $L_i^H U_i$ with $i=0,1,\ldots,(n_j-1)/2-1$, where $L_i$ and $U_i$ are derived from $G_{red}$ as shown in FIG. 5 for the case $i=0$ and for the general i-th case. It is worth noting that for the case P=64 it results $n_j=9$ and so 4 matrices $L_i^H U_i$, each one of $<J \times J>$ dimension, have to be evaluated.

Figure 4:
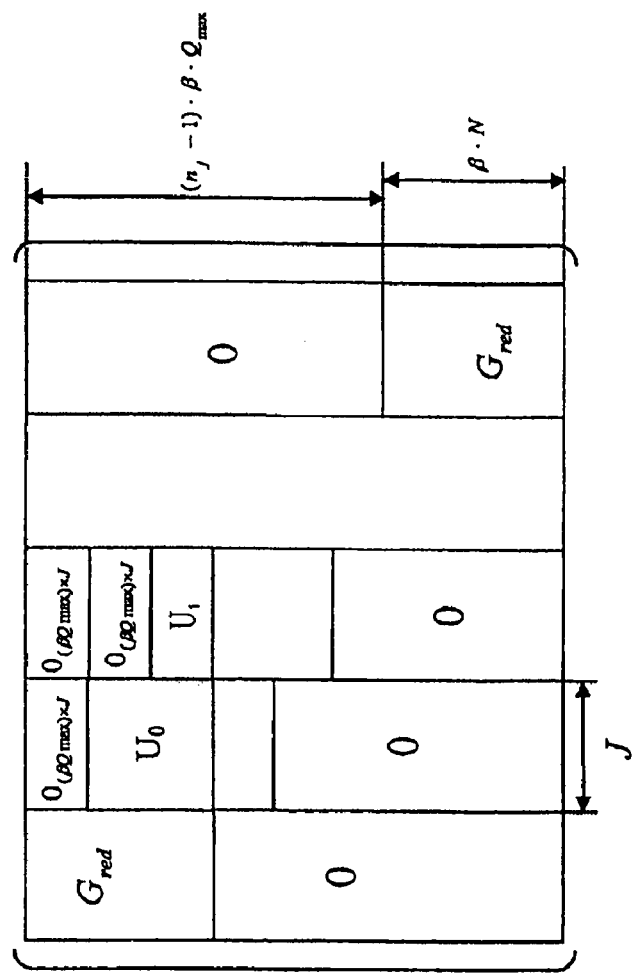
FIG. 4 shows a matrix product operation in a possible embodiment of the present invention.
Figure 4:
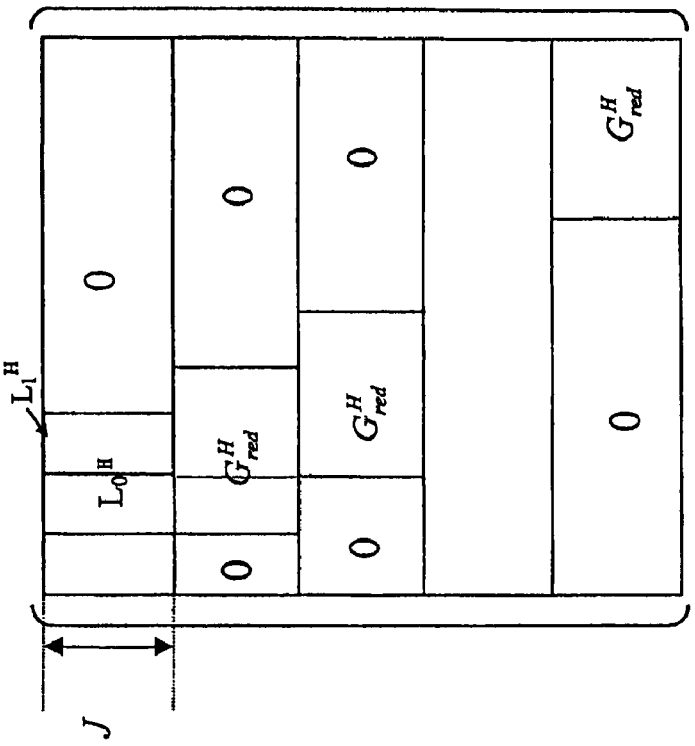

This is shown in greater detail in FIGS. 4 and 5. Specifically, FIG. 4 shows the $$G_{ext}^H G_{ext}$$

matrix product, while FIG. 5 shows the $L_i$ and $U_i$ matrices for the case i=0 and for the general i-th case. The dimensions of $L_i$ and $U_i$ are $<\beta \cdot (P-1-i \cdot Q_{max}) \times J>$ for $i<(n_j-1)/2$.

Figures 6, 8:
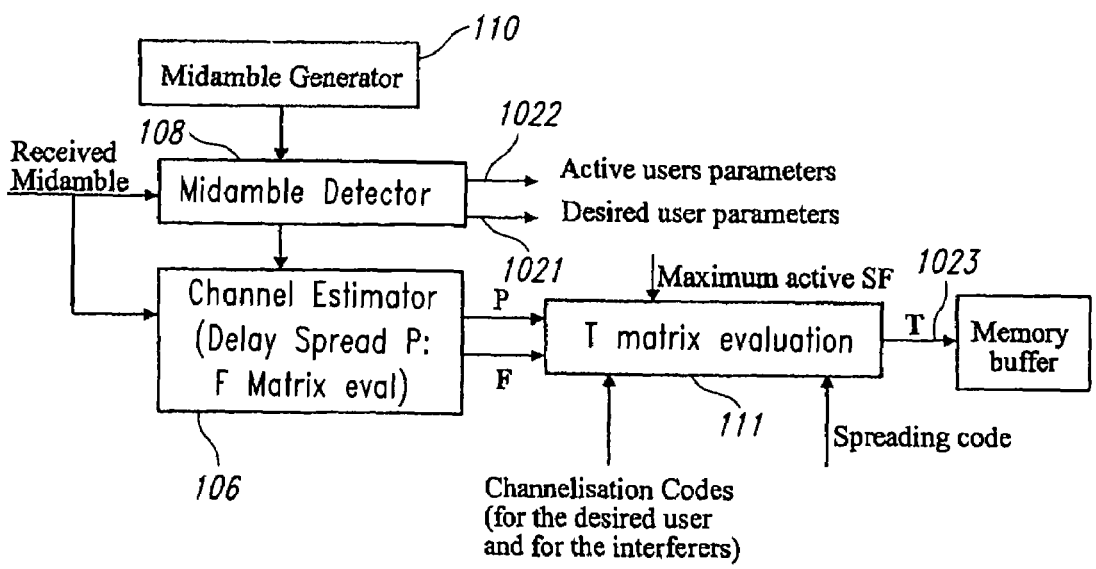
FIG. 6 shows the upper triangular part of a matrix generated by the operation of FIG. 4.
FIG. 8 shows the functional blocks of an estimator for possible use within the framework of the present invention.

Matrix $$G_{ext}^H G_{ext}$$

is composed by $n_j \times n_j$ blocks of dimension $<J \times J>$ each. Its upper triangular part is defined as shown in FIG. 6 where index $m=(n_j-1)/2-1$:

Finally, it can be demonstrated that the $$G_{ext}^H G_{ext}$$

matrix is Hermitian. This property can be exploited in order to reduce the computational load.

The main advantages of the operations (i), (ii) and (iii) above as applied to the original C matrix can be summarized as follows:
all the operations have to be performed in a very regular structure without any redundancy as it is in the original case. This allows also the use of a very simple control unit to manage all the data processing;
the resulting $$G_{ext}^H G_{ext}$$

matrix is appreciably more well-conditioned from the numerical viewpoint than the original one. Indeed, this matrix results to be increasingly diagonally dominant as the channel is increasingly characterized by a dominant path. This matrix characteristic is due to the properties of the spreading codes (channelization plus scrambling codes) and allows the use of a more optimized algorithm for the inversion of matrix $$W = (G_{ext}^H G_{ext} + \sigma^2 I)$$

and so a considerable reduction in the overall computational complexity without any performance penalty.

A possible efficient implementation can be based on a hardware/software architecture where a dedicated hardware engine is used for those tasks that are more computational intensive (such as the derivation of $L_i^H U_i$ sub-matrixes and the inversion of the matrix W), while predominantly control-oriented operations are performed via software on a microprocessor/microcontroller.

After this simplification we can work on matrix of reduced dimension and it is also easier to resolve Eq 30 and compute:

$$\tilde{T}_{red} = \left( \tilde{G}_{red}^H \cdot \tilde{G}_{red}^H + \sigma_n^2 \cdot I \right)^{-1} \cdot \tilde{G}_{red}^H \quad \text{Eq 30}$$

Firstly, direct calculation of the $$\tilde{G}_{red}^H \cdot \tilde{y}(i)$$

product is carried out:

$$d^{(J)}\left(i \cdot J + \frac{n_t - J}{2}\right) = G_{red}^H \cdot y(i+1) \quad \text{Eq 38}$$

for $i = 0, 1, \ldots, N_j - 1$ $$d^{\left(\frac{n_t-J}{2}\right)}(0) = d^{\left(\frac{n_t-J}{2}\right)}\left(N_j \cdot J + \frac{n_t - J}{2}\right) = 0$$

where the factor y(i) is a defined in Eq, $N_j$ is the same for all the active codes, $n_t = n_j \cdot J$ and the vectors $$d^{(J)}\left(i \cdot J + \frac{n_t - J}{2}\right),$$

each of dimension J, can be evaluated directly from the $G_{red}^H$ matrix as shown in Eq 38 and then stored in a proper buffer memory $B = d^{(J*Nj+nt-J)}(0)$ of $N_j \cdot J + n_t - J$ complex elements.

The notation $d^{(l)}(p)$, with l and p positive indices, means a vector of length l obtained taking l elements from the buffer memory B starting from the p-th element.

The term $$d^{(J)}\left(i \cdot J + \frac{n_t - J}{2}\right)$$

can be efficiently evaluated by means of proper FIR implementing the correlation between the received samples y(i) and the rows of the $$G_{red}^H$$

matrix.

The last step towards data detection can be done through the following operation:

$$x(i) = (W^{-1})_{red} \cdot d^{(n_t)}(i \cdot J) \text{ for } i=0,1,\ldots,N_j-1 \quad \text{Eq 39}$$

where the $(W^{-1})_{red}$ matrix is derived by the J central rows of the $W^{-1}$ matrix.

It will be appreciated that the null elements added in the upper and lower parts of the buffer memory B, see Eq 38, can be dispensed with by adopting a slightly more complex control logic. Indeed, for data detection, see Eq 39, only the useful columns of the $(W^{-1})_{red}$ matrix can be used for the first $(n_j-1)/2$ steps and the last $(n_j-1)/2$ steps. Also this operation can efficiently be implemented by means of a FIR.

Following this approach and by considering the same example case as above (i.e., P=64, J=16 and β=2) the overall complexity can be further reduced by more than 73% resulting in a final figure of about 7 GMAC/s.

As already mentioned, when $Q_j=1$ we have a QPSK transmission with the scrambling code multiplying the symbols of one single user. All the considerations done for the $Q_j=Q_{max}=16$ can be re-used. In particular we still refer to a fixed width processing window can be referred to that amounts to $N=Q_{max}+P-1$ symbols and this way at each sliding window step 16 symbols can be estimated.

The basic idea in order to re-use the same implementation as for the $Q_j=Q_{max}=16$ case, is to consider to have J=16 active codes with spreading factor $Q=Q_{max}$ and all the variables J dependent of the previous case can still be used. Moreover, the columns of a diagonal matrix $C_{red}$ <16×16> whose diagonal elements are the chips of the scrambling code are considered as orthogonal codes (different from the spreading ones).

By exploiting the actual characteristics of the case $Q_j=1$ further reduction can be obtained in terms of computational complexity and therefore power consumption. For instance, instead of the $$G_{ext}^H G_{ext}$$

it is possible to consider its central sub-matrix with dimension <N+P−1×N+P−1> and use this for subsequent algorithm operations by paying attention to the re-definition of $n_t=N+P-1$.

Basically the first steps for system implementation of the solution described in the foregoing are as follows:

I. Storing the desired slot (memory requirement: (2560-GP)*Num_bit*β, (with GP=96 or 192);

II. Midamble extraction and its processing:
 user parameters definition (channelization code, SF, etc . . . );
 estimates for all the other active users (number of active users in the slot and their parameters, as channelization codes etc . . . );
 channel estimation (delay spread=P, definition for sliding window setting, matrix F calculation, etc . . . ):
 i) single cell scenario: only one matrix must be evaluated.
 ii) multiple cell scenario (soft-handover): several matrices must be evaluated to obtain the T matrix for the detection algorithm;
 evaluation of the T matrix based on: F matrix, active channelization code set and spreading code(s);
 T matrix storage (memory requirement: depend on the following parameters: active users, cell scenario, P);

III. Processing unit setting based on the parameters estimated on the midamble;

IV. Demodulation of the first data field (two possible choices: starting from the first chip of the slot or from the midamble); and V. Demodulation of the second data field.

The estimates for all the other active users requires correlation between the received midamble and the entire active midamble set.

Figure 7:
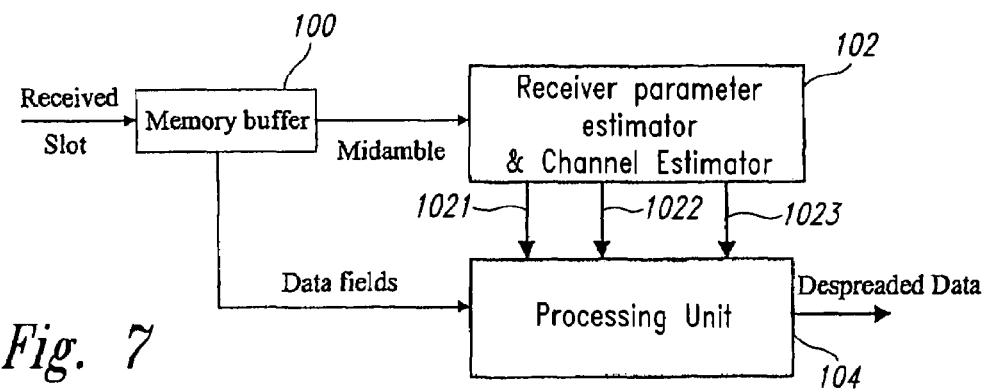
FIG. 7 is a block diagram of a detector architecture.

An exemplary architecture corresponding to the foregoing is shown in FIG. 7, where reference 100 designates a memory buffer adapted to separate the midamble from the data fields in the received slot.

Reference 102 designates a block acting both as a receiver parameter estimator and a channel estimator.

Essentially, block 102 derives from the midamble:
 the user parameters (delay spread P, channelization code, etc. . . . )—line 1021;
 the interference parameters—line 1022; and
 the T matrix—line 1023.

Reference 104 finally designates a processing unit configured to generate the de-spread data based on the data fields from buffer 100 and the parameters received from block 102 over lines 1021, 1022 and 1023.

The functional modules/blocks comprising estimator 102 are shown in greater detail in FIG. 8.

Estimator 102 has the role of estimating several parameters for the correct detection. It uses the knowledge of the user midamble to estimate the channel impairments (i.e., performing the channel estimation), modelled as channel coefficient in the F matrix and delay spread P (this function is implemented in a functional block called "channel estimator" 106).

Simultaneously, from the available midambles in the current slot for the serving-cell (and for some neighboring cells if the respective information is available), the system determines the active interfering users and their parameters useful for the detection algorithm (this function is implemented in a block called "midamble detector" 108).

The channel estimator function can be implemented as a correlator in which some shifted versions of the known midamble are compared with the received midamble obtaining the channel coefficients. The delay spread P is evaluated as the maximum delay for which the correlator output is above a threshold (the threshold could be related to a noise measure).

The midamble detector 108 correlates the received midamble with all those available for the current slot. In fact, if there are other users in the cell, their midambles are sent in parallel with the midamble of the desired user. The correlation value will be above a threshold only if one of these midamble is present. The threshold can be set using the correlator output value for the desired user.

The midambles can be generated by a block 110. This may be comprised of a look up table where all the possible midambles used in the TDD systems are stored. Alternatively, it may be a real midamble generator.

If a generator is used, the midamble seeds only have to be stored where the cell specific midambles may be generated, e.g., by using the formula provided in "Physical Channel and Mapping of Transport Channel onto Physical Channels (TDD)"; 3GPP TS 25.221; annex A.1 and A.2, which is incorporated herein by reference in its entirety.

Processing unit 104 loads a certain number of samples (observation window) from the memory buffer 100 and performs the detection algorithm computing the T matrix which provides a certain number of symbols for the desired user. This number depends on the delay spread and the maximum spreading factor used in the observed slot.

This processing unit can be implemented in hardware as a re-configurable FIR filters bank, where the filters coefficients are the elements of the matrix T.

The matrix T can be evaluated both in HW or in SW, depending on whether it has to be upgraded between two observation windows, of course evaluation of the matrix T requires an efficient algorithm for matrix inversion.

The invention permits, e.g., implementation of a linear receiver scheme for 3G TD-CDMA radio systems for use in downlink detection. The receiver mitigates both ISI and MAI, using the ZF and MMSE criterion.

A relevant sliding window formulation is provided to approach both ZF and MMSE algorithms. The sliding window is synchronized with the symbol rate of the slowest data stream.

The system model assumes a variable data rate, which means that all the active users are available to transmit with different spreading factors.

The sliding window formulation is based on variable length blocks, thus avoiding fixed block data stream, as in conventional multi-user detection. A structured model of intercell interference is preferably considered, where knowledge of all interfering users is assumed.

It will be appreciated by a person skilled in the art that other variations and/or modifications may be made to the present invention as shown in the specific embodiments without departing from the spirit or scope of the invention as broadly described. The present embodiments are, therefore, to be considered in all respects to be illustrative and not restrictive.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

We claim:

1. A method of demodulating received digital signals exposed to intersymbol interference as well as multiple access interference, wherein the digital signals are subjected to spreading using spreading factors including a maximum spreading factor, the method comprising:
    linearly detecting said digital signals by combating said intersymbol interference by equalizing said received digital signals; and
    mitigating said multiple access interference by detecting said digital signals by applying sliding window detection using a sliding window with a width equal to the maximum spreading factor plus a corresponding delay spread minus 1.

2. The method of claim 1 wherein the digital signals are received as data blocks, further comprising partitioning each of said data blocks into a plurality of smaller portions, wherein linearly detecting said digital signals includes processing said smaller portions thereby avoiding processing each data block as a whole.

3. The method of claim 1 wherein linearly detecting said digital signals involves applying to said digital signals one of a zero forcing detection scheme and a minimum mean square error detection scheme.

4. The method of claim 1, further comprising generating a detection matrix structured to be decomposed into a plurality of identical submatrixes.

5. A method of demodulating received digital signals exposed to intersymbol interference as well as multiple access interference, and spread using spreading factors including a maximum spreading factor, the method comprising:
    linearly detecting said digital signals by combating said intersymbol interference by equalizing said received digital signals, wherein said digital signals are arranged in blocks including first and second data symbol blocks and a midamble therebetween; and
    mitigating said multiple access interference by detecting said digital signals using sliding window detection, wherein a window of said sliding window detection has a width given by $Q_{max}+P-1$, where $Q_{max}$ represents the maximum spreading factor and P represents a corresponding delay spread.

6. The method of claim 5 wherein said linearly detecting comprises applying to said digital signals a zero forcing detection scheme 7. The method of claim 5 wherein said linearly detecting comprises applying to said digital signals a minimum mean square error detection scheme.

8. The method of claim 5, further comprising generating a detection matrix structured to be decomposed into a plurality of identical submatrixes.

9. A method of receiving digital signals exposed to intersymbol interference as well as multiple access interference in a multiuser scenario including other active users, wherein said digital signals are subject to spreading by means of spreading factors and arranged in blocks including first and second data fields and a midamble therebetween, the method including the steps of:

defining and storing a desired signal slot;

extracting said midamble from the digital signals and deriving therefrom at least one user parameter definition and estimates for other active users in the slot;

performing channel estimation by obtaining a detection matrix;

demodulating said first data field; and demodulating said second data field, wherein said detection matrix is defined as:

$$\tilde{x}_a(k) = \tilde{T} \cdot \tilde{y}(k)$$

where:

$$\tilde{y}(k) = y^{(Q+P-1)}(kQ+P-1) \quad k=1,2,\ldots,K$$

$$\tilde{a}(k) = a^{(Q+P-1)}(kQ+P-1) \quad k=1,2,\ldots,K$$

and:

$$\tilde{G} = G^{(Q=P-1)}(kQ=P-1)$$

$$\tilde{R}_a = R_a^{(Q+P-1)}(kQ+P-1)$$

$$\tilde{R}_n = R_n^{(Q+P-1)}(kQ+P-1)$$

$$\tilde{W}_{MI} = W_{MI}^{(Q+P-1)}(kQ+P-1)$$

so a linear transformation becomes:

$$\tilde{T} = \left(\tilde{G}^H \cdot \tilde{R}_n^{-1} \cdot \tilde{G} + \tilde{R}_a^{-1}\right)^{-1} \cdot \tilde{G}^H \cdot \tilde{R}_n^{-1} = \tilde{W}_{MI} \cdot \left(\tilde{G}^H \cdot \tilde{R}_n^{-1} \cdot \tilde{G}\right)^{-1} \cdot \tilde{G}^H \cdot \tilde{R}_n^{-1}.$$

10. The method of claim 9 wherein said deriving of said estimates comprises correlating said midamble with a set of midambles used by said other active users.

11. The method of claim 9 wherein said first data field is demodulated starting from a first chip of the desired signal slot.

12. The method of claim 9 wherein performing channel estimation comprises obtaining a single detection matrix.

13. The method of claim 9, wherein performing channel estimation comprises obtaining a plurality of detection matrixes.

14. The method of claim 9 wherein the detection matrix is structured to be decomposed into a plurality of identical sub-matrixes.

15. The method of claim 9 wherein the at least one user parameter definition comprises a channelization code.

16. The method of claim 9 wherein the at least one user parameter definition comprises a spreading factor.

17. The method of claim 9 wherein the estimates for other active users comprise an estimate of a number of active users in the slot.

18. The method of claim 9 wherein the estimates for other active users comprise an estimate of respective user parameters of other active users in the lot.

19. A receiver for demodulating received digital signals spread using a set of spreading factors and exposed to intersymbol interference as well as multiple access interference, the receiver comprising:

a linear detector configured to detect said digital signals, said detector including an equalizer configured to combat said intersymbol interference by equalizing said received digital signals and to mitigate said multiple access interference by detecting said digital signals using sliding window detection employing a width given by $Q_{max}+P-1$, where $Q_{max}$ represents a maximum spreading factor in the set of spreading factors and P represents a corresponding delay spread; and a memory buffer.

20. The receiver of claim 19 wherein said linear detector comprises a zero forcing detector.

21. The receiver of claim 19 wherein said linear detector comprises a minimum mean square error detector.

22. The receiver of claim 19, further comprising a synchronizer to synchronize said sliding window detection with the symbol rate of the slowest data streams of said signals.

23. A receiver for demodulating received digital signals spread using a set of spreading factors and exposed to intersymbol interference as well as multiple access interference, the receiver comprising:

a linear detector configured to detect said digital signals, wherein said digital signals are arranged in blocks including first and second data symbol blocks and a midamble therebetween, said detector including an equalizer for combating said intersymbol interference by equalizing said received digital signals as well as mitigating said multiple access interference by detecting said digital signals using sliding window detection with a width given by $Q_{max}+P-1$, where $Q_{max}$ represents a maximum spreading factor in the set of spreading factors and P represents a corresponding delay spread; and a memory buffer.

24. The receiver of claim 23 wherein said linear detector comprises a zero forcing detector.

25. The receiver of claim 23 wherein said linear detector comprises a minimum mean square error detector.

26. The receiver of claim 23, including a synchronizer to synchronize said sliding window detection with the symbol rate of the slowest data streams of said digital signals.

27. A receiver for receiving digital signals exposed to intersymbol interference (ISI) as well as multiple access interference (MAI) in a multiuser scenario including other active users, wherein said digital signals are subject to spreading by means of spreading factors and arranged in blocks including first and second data fields and a midamble therebetween, the receiver including:

a memory configured to store a desired signal slot;

an estimator configured to extract said midamble from the digital signal and derive therefrom at least one user parameter definition and estimates for other active users in said desired signal slot, said estimator configured to perform channel estimation by obtaining at least one detection matrix, wherein said estimator includes a correlator wherein a shifted version of said midamble is compared with a received midamble to obtain a channel coefficient; and a processing unit configured to demodulate said first data field, and said second data field.

28. The receiver of claim 27 wherein said estimator is configured to derive said estimates for other active users by correlating said midamble with an entire set of midambles used by said other active users.

29. The receiver of claim 27 wherein said processing unit demodulates said first data field starting from a first chip of the desired signal slot.

30. The receiver of claim 27, wherein said processing unit demodulates said first data field starting from the midamble.

31. The receiver of claim 27, including an evaluator element for evaluating a delay spread associated to said digital signals as a maximum delay for which the correlator output is above a given threshold.

32. The receiver of claim 27, including a sensor for sensing a midamble sent in parallel with said midamble by another of said other active users, said correlator being structured to set said given threshold using the correlator output value for the desired user.

33. The receiver of claim 27, further comprising a generator block for generating a plurality of midambles representative of midambles used by other active users within said multiuser scenario.

34. The receiver of claim 33, wherein said generator block is a look-up table where said plurality of midambles are stored.

35. The receiver of claim 33, wherein said generator block is a midamble generator generating said plurality of midambles starting from respective midamble seeds.

36. The receiver of claim 27, wherein a single said detection matrix is obtained in said estimator.

37. The receiver of claim 27, wherein a plurality of said detection matrixes are obtained in said estimator.

38. The receiver of claim 27, wherein said at least one detection matrix is computed on the basis of a matrix representative of a channel on which said digital signals are transmitted and a channelization code and spreading factor associated therewith.

39. The receiver of claim 27 wherein the at least one user parameter definition comprises a channelization code.

40. The receiver of claim 27 wherein the at least one user parameter definition comprises a spreading factor.

41. The receiver of claim 27 wherein the estimates for other active users comprise an estimate of a number of active users in the slot.

42. The receiver of claim 27 wherein the estimates for other active users comprise an estimate of respective user parameters of other active users in the slot.

43. A receiver for receiving digital signals exposed to intersymbol interference (ISI) as well as multiple access interference (MAI) in a multiuser scenario including other active users, wherein said digital signals are subject to spreading by means of spreading factors and arranged in blocks including first and second data fields and a midamble therebetween, the receiver including:
a memory configured to store a desired signal slot;
an estimator configured to extract said midamble from the digital signal and derive therefrom at least one user parameter definition and estimates for other active users in said desired signal slot, said estimator configured to perform channel estimation by obtaining at least one detection matrix; and
a processing unit configured to demodulate said first data field, and said second data field, wherein said at least one detection matrix is defined as:

$\tilde{x}_a(k) = \tilde{T} \cdot \tilde{y}(k) \quad k=1,\ldots,K$ where:
$\tilde{x}_a$ is the vector of symbols to be detected
$\tilde{T} = (G^H \cdot G^H + \sigma_n^2 \cdot I)^{-1} \cdot G^H$ is a matrix applying linear transformation
$\tilde{y}(k)$ is the vector of received data
k ticks with the symbol interval and $K = \dfrac{N}{Q}$ represents the number of symbols in the associated data stream with the largest spreading factor $\tilde{y}(k) = y^{(Q+P-1)}(kQ+P-1) \quad k=1,2,\ldots,K$ $\tilde{a}(k) = a^{(Q+P-1)}(kQ+P-1) \quad k=1,2,\ldots,K$ by further defining the matrices:

$\tilde{G} = G^{(Q+P-1)}(kQ+P-1)$ $\tilde{R}_a = R_a^{(Q+P-1)}(kQ+P-1)$ $\tilde{R}_n = R_n^{(Q+P-1)}(kQ+P-1)$ $\tilde{W}_{MI} = W_{MI}^{(Q+P-1)}(kQ+P-1)$ the linear transformation becomes:

$$\tilde{T} = \left(\tilde{G}^H \cdot \tilde{R}_n^{-1} \cdot \tilde{G} + \tilde{R}_a^{-1}\right)^{-1} \cdot \tilde{G}^H \cdot \tilde{R}_n^{-1} = \tilde{W}_{MI} \cdot \left(\tilde{G}^H \cdot \tilde{R}_n^{-1} \cdot \tilde{G}\right)^{-1} \cdot \tilde{G}^H \cdot \tilde{R}_n^{-1}.$$

44. A method of receiving a digital signal arranged in blocks including data fields and a midamble, the method comprising:
defining and storing a desired signal slot;
defining user parameters based on the midamble;
estimating user parameters for other active users in the desired signal slot based on the midamble;
estimating channel impairments using a detection matrix; and
demodulating the data fields using the defined user parameters, the estimated user parameters and the estimated channel impairments, wherein said detection matrix is defined as:

$\tilde{x}_a(k) = \tilde{T} \cdot \tilde{y}(k)$ where:

$\tilde{y}(k) = y^{(Q+P-1)}(kQ+P-1) \quad k=1,2,\ldots,K$ $\tilde{a}(k) = a^{(Q+P-1)}(kQ+P-1) \quad k=1,2,\ldots,K$ and:

$\tilde{G} = G^{(Q+P-1)}(kQ+P-1)$ $\tilde{R}_a = R_a^{(Q+P-1)}(kQ+P-1)$ $\tilde{R}_n = R_n^{(Q+P-1)}(kQ+P-1)$ $\tilde{W}_{MI} = W_{MI}^{(Q+P-1)}(kQ+P-1)$ so a linear transformation becomes:

$$\tilde{T} = \left(\tilde{G}^H \cdot \tilde{R}_n^{-1} \cdot \tilde{G} + \tilde{R}_a^{-1}\right)^{-1} \cdot \tilde{G}^H \cdot \tilde{R}_n^{-1} = \tilde{W}_{MI} \cdot \left(\tilde{G}^H \cdot \tilde{R}_n^{-1} \cdot \tilde{G}\right)^{-1} \cdot \tilde{G}^H \cdot \tilde{R}_n^{-1}.$$

45. The method of claim 44 wherein the defined user parameters comprise a channelization code and a spreading factor.

46. The method of claim 44, further comprising generating the detection matrix by generating a matrix having a plurality of identical submatrixes.

47. A receiver to receive a digital signal arranged in blocks including data fields and a midamble, the receiver comprising:
- means for generating based on the midamble:
  - user parameters;
  - estimates for other active user parameters of a desired signal slot; and
  - a channel impairment estimate based on a detection matrix, wherein the means for generating is configured to compare a shifted version of the midamble with a received midamble to obtain a channel coefficient; and
- means for demodulating the data fields coupled to the means for generating.

48. The receiver of claim 47 wherein the means for generating comprises:
- a midamble detector; and
- a channel estimator.

49. The receiver of claim 48 wherein the means for generating further comprises a midamble generator.

50. A method of demodulating a received digital signal exposed to intersymbol and multiple access interference, comprising:
- partitioning the received digital signal into data blocks and an amble;
- generating a detection matrix based on the amble, the detection matrix having a plurality of identical submatrixes;
- demodulating the received digital signal using the detection matrix; and
- applying sliding window detection to the amble with a window width equal to a maximum spreading factor in a set of spreading factors plus a corresponding delay spread minus 1.

* * * * *